Patented Jan. 21, 1947

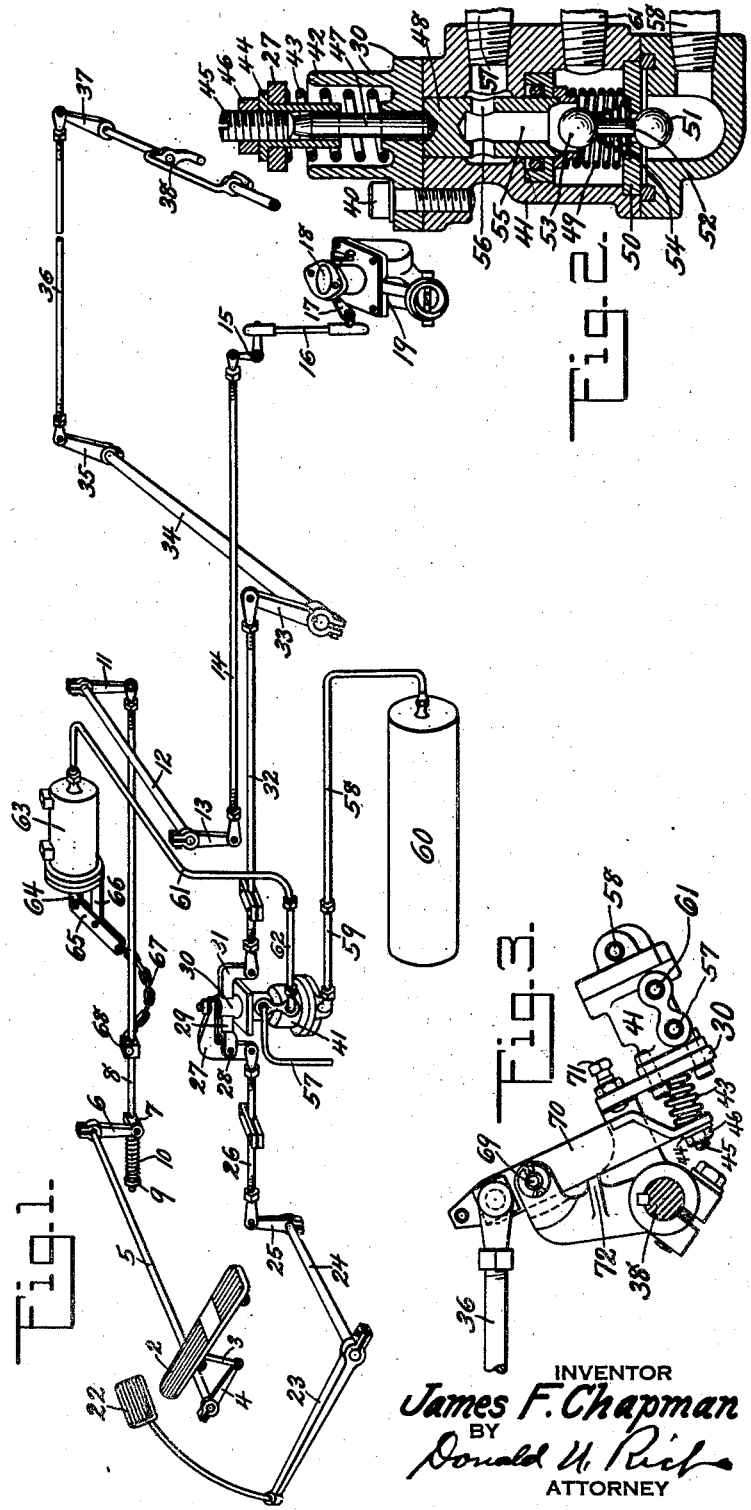

2,414,717

UNITED STATES PATENT OFFICE 2,414,717

CLUTCH AND THROTTLE CONTROL

James F. Chapman, Upper Darby, Pa., assignor to ACF-Brill Motors Company, New York, N. Y., a corporation of Delaware Application September 23, 1942, Serial No. 459,449

5 Claims. (Cl. 192—.01)

This invention relates to a clutch and throttle control mechanism of the type in which clutch movements exercise a limited control over the throttle mechanism.

Excessive clutch face wear has been occasioned by careless operators who race their engine prior to engagement of the clutch or by operators who drive with their foot resting on the clutch, thus unconsciously relieving the pressure on the clutch faces and causing slippage. Poor judgment in the rate of engagement of the clutch will cause excessive clutch wear as will also deliberate slipping of the clutch by the operator. It has been found that the clutches in motor vehicles of public carriers have a normal life varying from 10,000 to 50,000 miles, with the variation due almost entirely to poor operation of the clutch. It is an object, therefore, of the present invention to provide a clutch operating and engine control mechanism with the parts so connected as to insure a reduction of engine speed to a predetermined low range upon movement to release the clutch.

A further object of the invention is the provision of a force actuated controller interposed between the clutch pedal and the clutch throwout and controlling the range of movement of the engine control mechanism.

A still further object of the invention is the provision of a control mechanism positively limiting the top speed of an engine upon movement of the clutch release mechanism away from fully engaged position.

A yet further object of the invention is the provision of means operable to permit smooth acceleration of an engine upon movement of the clutch actuated from substantially engaged to normal running position.

These and other objects of the invention will be apparent to persons skilled in the art from a study of the following description and accompanying drawings, in which Figure 1 is a perspective view of the improved mechanism;

Fig. 2 is a sectional view through the force actuated controller of Fig. 1;

Fig. 3 is a detail view showing a slight modification of Fig. 1 in that the position of the force actuated controller has been changed.

Figure 4:
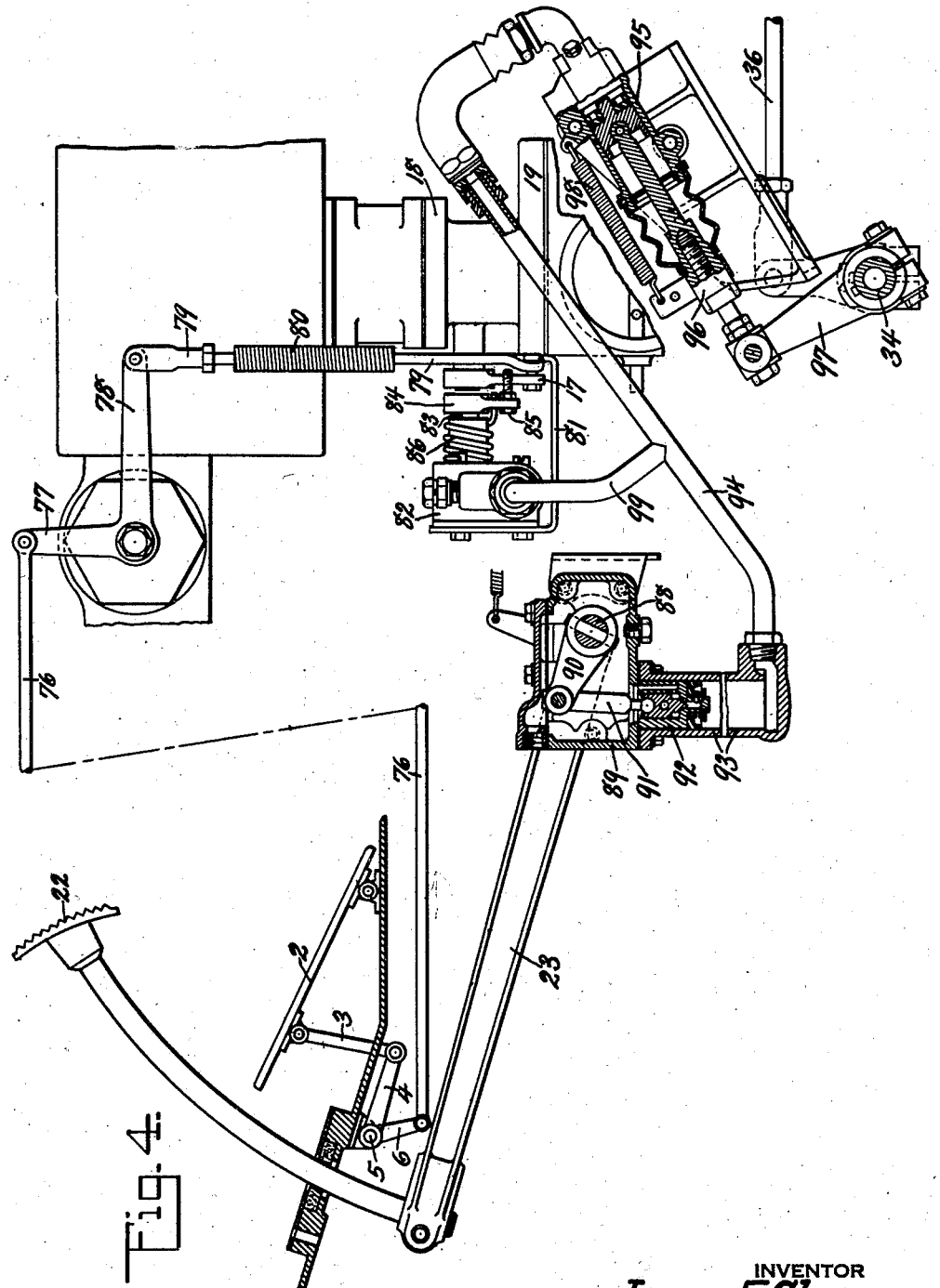
Fig. 4 is a diagrammatic view of a further modification with parts broken away to better disclose the construction of the mechanism.

Referring now to the drawings in detail, it will be seen that in each case the entire mechanism is composed of three main parts, namely, an engine control mechanism, a clutch operating mechanism and a force actuated controller operated by the clutch actuating force and controlling the movements of the engine control mechanism. As shown in Fig. 1, the engine control mechanism comprises an accelerator pedal 2 connected by push rod 3 to an end of crank 4 which is fixed upon an end of cross shaft 5. The other end of the cross shaft has non-rotatably connected thereto an arm 6 carrying at its lower end a block 7 slidably mounted upon rod 8. The rod 8 is provided at one end with an adjusting collar 9 against which bears one end of a spring 10, the other end of which bears against block 7 previously referred to. The opposite end of rod 8 is pin connected to arm 11 fixed on cross shaft 12 which in turn has non-rotatably mounted thereon an arm 13. The free end of arm 13 is pivotally connected to rod 14 which is in turn connected to one arm of a bell-crank 15, the other arm of which is connected to the more or less conventional carburetor pull rod 16. The pull rod is connected to arm 17 fixed to the conventional throttle valve mounted in the eduction pipe 18 of the carburetor 19. From the above and with the linkage arranged as shown, it will be seen that application of pressure to the accelerator pedal will cause tension in rods 8, 14 and 16 thus opening the throttle valve in the carburetor eduction pipe. The slidable connection between block 7 and rod 8 permits relative movement between the accelerator pedal and rod 8 with the relative movement controlled by compression spring 10. In other words, if the throttle valve were held closed, movement of the accelerator pedal could only compress spring 10 and the energy available to open the throttle would be only that stored in spring 10.

The clutch operating mechanism as shown in Fig. 1 includes the clutch operating pedal 22 which is connected to an end of arm 23 non-rotatably mounted on shaft 24 which also non-rotatably carries an arm 25. Arm 25 is connected to a rod 26 which in turn is connected to one end of an angle form member 27. An intermediate portion of the angle form member is fulcrummed or anchored as at 28 to one end of an arm 29 fixed to the top portion of a bracket 30. The bracket has attached thereto a second arm 31 to which is connected rod 32 with the opposite end connected to an arm 33. The arm 33 is non-rotatably mounted on cross shaft 34 which also non-rotatably carries a second arm 35 pin connected to a rod 36. The rod 36 is connected through arm 37 to clutch throwout collar 38. It will thus be seen that depression of clutch pedal 22 will place the linkage consisting of the bracket 30 and all of the rods and arms referred to under tension and cause movement of the clutch throwout collar to released position. The clutch will, of course, be adjusted as is customary so that a certain predetermined free movement of the clutch pedal is had before actual pressure can be applied to throw out the clutch.

The bracket 30, forming part of the clutch throw-out linkage previously referred to, has mounted thereon as by bolts 40 a valve structure 41, all as clearly shown in Fig. 2. The free end of angle form member 27 overlies and has its movement limited by upstanding cylindrical extension 42 of bracket 30. Located within this cylindrical extension is a spring 43 bearing at one end on the bracket and at the other end against the under side of the free arm of angle form member 27. The free end of the angle form member 27 has attached thereto a collar 44 internally threaded to receive an adjusting screw 45 which may be locked in position by locknut 46. The lower end of adjusting screw 45 bears against thrust pin 47 extending through an opening in the bracket and bearing against the upper end of a valve slide 48. The valve slide is mounted for reciprocation in the valve body and is normally held in its upper position by a compression spring 49. The lower end of the compression spring bears against a plate 50 having a central opening therein finished to provide a valve seat against which ball 51 is normally seated. The ball 51 is connected by link 52 to a second ball 53 and the connected balls are normally held in the upper position by a compression spring 54. The valve slide is provided with an axial bore 55 formed at its lower edge with a valve seat adapted to cooperate with ball 53 and connecting through ports 56 with passages and pipe 57 which forms an exhaust to atmosphere for the valve. Chambers are provided on opposite sides of plate 50 with the lowermost chamber being connected by pipe 58 including a flexible connection 59 to an air reservoir or other source of pressure 60. The chamber above plate 50 is connected by pipe 61 which includes a flexible length 62 to a throttle blockout cylinder 63. From the preceding it will be seen that downward movement of the free end of angle form member 27 is resisted by spring 43 but when downward movement occurs the push rod 47 will move the slide valve 48 downwardly causing ball 53 to seat against the slide prior to the pushing of ball 51 off of its seat on plate 50. When ball 51 is unseated air under pressure can flow into pipes 61 but not to atmosphere since ball 53 has previously closed the connection to exhaust pipe 57. Upward movement of the free end of 27 will, of course, first permit ball 51 to seat, then cause the slide to move away from ball 53 exhausting cylinder 63 through pipe 61 to atmosphere by way of pipe 57. The amount of movement of arm 27 to cause valve operation can, of course, be controlled by adjusting screw 45. It will be seen that without any control over the free end of arm 27 no motion could be transmitted from rod 26 to rod 32 of the clutch operating mechanism. However, by interposing the special force actuated controller in the clutch linkage the first movements of angle member 27 will cause an operation of the valve, then 27 becomes seated against extension 42 and the rod 26 is to all intents and purposes rigidly connected to 32 and can transmit motion directly thereto, that is, after 27 becomes seated on extension 42 the entire controller moves with rods 26 and 32 with the motion permitted by the flexible connections 59 and 62 previously referred to. In other words, force applied to the clutch pedal cannot become active at the clutch throwout collar 38 until the valve has been moved and arm 27 has come to rest upon extension 42. It is, of course, obvious that spring 43 is not of sufficient strength to resist movement of arm 27 sufficiently to permit clutch throwout. However, the proper strength spring is selected in accordance with the desired operation so as to insure valve operation prior to release of the clutch to the point where excessive slippage could occur. In other words, preselection of the leverage of angle form member 27 and the strength of spring 43 will permit accurate control of the point at which direct inflexible connection is made between the clutch pedal and clutch throwout collar, thus the exact point of absolute clutch release can be accurately controlled.

The throttle blockout cylinder 63, previously referred to, is provided with a piston normally carried in its innermost position and having the piston rod 64 pivotally connected to levers 65 which in turn have their intermediate portion connected to an arm 66 formed integral with or attached in some suitable manner to the cylinder head. Levers 65 are connected at their free end through a flexible connection 67 to a block 68 clamped upon rod 8 at a predetermined location. The flexible connection is shown in the present instance as formed of chain but the exact form is immaterial. However, it is important that sufficient slack be provided in the connection as to permit full movement of rod 8 to throttle open position when the piston is in its innermost position shown in Fig. 1. When the piston moves outwardly under air pressure admitted to the cylinder by pipe 61, then lever 65 will cause the flexible connection 67 to pull rod 8 toward throttle closing position. By way of illustration, the engine control mechanism, which includes the carburetor, is so adjusted that when the accelerator is in full closed throttle position with the parts as shown in Fig. 1 the engine rotates at 500 R. P. M. and the block 68 is clamped to rod 8 in such a position as to restrict opening movement of the throttle beyond a position holding the engine at say 1000 R. P. M. when the piston of the cylinder 63 is in its outermost position (not shown). If the accelerator pedal is in its uppermost position, that is, throttle closed, then actuation of the piston will in no way effect the throttle setting but only lessen the amount of the slack in 67. If the accelerator pedal is clear down or in throttle open position and the piston of cylinder 63 is actuated to its outermost position, then connection 67 will through block 68 pull the rod 8 toward a throttle closing position and bring the engine from full speed to the intermediate speed of say 1000 R. P. M. This movement of rod 8 is permitted by compression of spring 19. If the piston of cylinder 63 has moved the rod 8 as just described and the operator then releases the accelerator, the rod 8 can immediately move to full throttle closed position, that is, return the engine to say 500 R. P. M. or idle.

In certain installations it may be handier to place the force actuated controller at some other location in the clutch release linkage and such placement is shown in Fig. 3. In this form the force actuated controller is so arranged as to take the place of arm 37 of Fig. 1 and wherever possible the same reference characters have been applied. As clearly shown the shaft which is rigidly connected to the clutch throwout collar has keyed and clamped thereto an element having two arms located substantially at right angles to each other and one providing a fulcrumed point 69 for a lever 70, one end of which is connected to the pull rod 36 and the other end provided with substantially the same arrangement of parts as was described in connection with Fig. 2 whereby operation of the valve 41 may be accomplished. The second arm of the element provides a surface to which the bracket 30 may be attached and which in turn will carry the valve 41. In this form, however, the degree of movement between lever 70 and bracket 30 is made adjustable by means of a set screw arrangement 71. Excessive movement of lever 70, which might result in displacement of spring 43 and associated valve parts, is controlled by means of a stop 72 as clearly shown in Fig. 3. It will be seen that tension placed in 36 will cause pivotal motion of lever 70 moving the slide valve parts as described in connection with Fig. 2 until the lever strikes the adjustable stop 71, after which the parts become a rigid part of the linkage and direct motion is transmitted to the clutch throwout collar. It is obvious that the arrangement shown in Fig. 3 may be substituted for any of the arms 25, 33, 35 or 37 of the clutch operating mechanism and it will also be obvious that insofar as control is concerned the modification of Fig. 3 will operate exactly as that shown in Fig. 1.

In some cases it may be desirable or necessary to provide fluid control for the clutch throwout mechanism and if so then the parts could be arranged as shown in Fig. 4 wherein the same reference numerals have been applied wherever possible in order to simplify the explanation. In this form the arm 6 of the engine control mechanism is connected directly by a rod 76 to one arm 77 of the bell-crank, the other arm 78 of which is connected by an extensible pull rod 79 to the throttle arm 17. As shown, the extensible pull rod is provided with a spring 80 which may be extended or stretched in case the throttle is held closed and the accelerator moved to throttle open position. Mounted on the carburetor 19 is a bracket 81 and this bracket has mounted thereon a throttle blockout cylinder 82. The piston of this cylinder is so connected as to cause rotation of a shaft 83 carrying at its outer end an arm 84 with the free end of the arm having connected thereto a bolt or other means 85 projecting into the path of movement of throttle arm 17. It will, of course, be obvious that a slack connection between the free end of arm 84 and throttle arm 17 may be made permitting adjustment exactly as was permitted in the construction of Fig. 1. A torsion spring 86 is provided which constantly urges the arm 84 to a position in contact with throttle arm 17.

Arm 23 of the clutch operating mechanism is connected to a shaft 88 journaled in a liquid reservoir 89 carried by any suitable part of the vehicle body. Shaft 88 has fastened thereto an arm 90 which in turn is connected by push rod 91 to piston 92 of a master cylinder 93. The master cylinder is connected by a pipe 94 to a clutch slave cylinder 95 which has its piston connected through piston rod 96 to an arm 97 mounted on a shaft such as the cross shaft 34 of Fig. 1 and which is connected by pull rod 36 to the clutch throwout collar. The arm 97 could, of course, be directly connected if desired to the shaft upon which the clutch throwout collar is mounted. Spring 98 is connected to the slave cylinder and to the piston and constantly urges the piston into its innermost position. The pipe 94 is provided with a branch pipe 99 directly connected to the throttle blockout cylinder 82 previously referred to.

It will be obvious that depression of clutch pedal 22 will cause piston 92 to move downwardly giving equal pressure in pipes 94 and 99 tending to move the pistons of throttle blockout cylinder 82 and of clutch slave cylinder 95. However, the throttle blockout cylinder parts and spring 86 are so adjusted as to move under a much lighter pressure than will the piston of the clutch slave cylinder. In other words, before the clutch can be thrown out by the slave cylinder the throttle block cylinder has moved arm 84 to such a position as to limit the range of movement of arm 17 of the engine throttle. The parts are adjusted to yield the same operation as described in connection with Fig. 1; that is, for example, when the accelerator is in throttle closed position the engine speed is limited to say 500 R. P. M. or idle. Movement of the accelerator to the floor or throttle open position will either move the throttle to wide open position or to an intermediate position with spring 80 stretching to accommodate the difference dependent upon the condition of throttle block cylinder 82. Depression of the clutch pedal will result in equal pressure in pipes 94 and 99 rendering the throttle block cylinder active and preventing the throttle arm 17 from moving except in the range from idle to intermediate or start position.

It will be seen that in all the forms the accelerator may operate in normal fashion provided the clutch pedal is in fully released or normal position and that it can be moved through a range running from idle or throttle closed to running or throttle open position. Depression of the clutch even a slight amount will cause the throttle blockout cylinder to operate limiting the movement of the accelerator except in a range from idle or throttle closed position to an intermediate or start position. The location of the start or intermediate position may be readily predetermined and adjusted dependent upon the conditions of service. It will be impossible for the clutch to be moved sufficiently to cause slipping without actuating the throttle block cylinder since in every case the force to be transmitted to the clutch throwout cannot be fully applied until the throttle blockout cylinder has functioned. Also, it will be impossible for an operator to cause excessive slipping of the clutch during starting for the clutch must be engaged with substantially its full pressure before the bleeding of the throttle blockout cylinder is permitted. The rate of bleeding may be, of course, controlled in any suitable manner such as by restricting the pipes 57 and 99 or in applying a check and bleeding by-pass in the pipe 99 in the hydraulic system. By controlling the bleeding rate it will be possible for an operator to fully depress the accelerator pedal during or prior to the engagement of the clutch but such depression will not have any effect beyond bringing the engine to the starting speed, then after the clutch is fully engaged the rate of bleeding will control the rate of movement of the throttle to open or running position. In this way adjustment could be made to obtain maximum acceleration without any possibility of slipping or without the use of any particular skill on the part of the operator. In case an operator had the accelerator fully depressed and placed his foot on clutch pedal 22 with too much pressure, the engine would immediately be returned to a low speed corresponding to the starting speed of say 1000 R. P. M., thus the so-called riding of the clutch would be prevented and also excessive slippage of the clutch through careless operation during intended deceleration of the vehicle which the engine may be driving.

While the constructions have been described more or less in detail with specific reference to the figures, it will be obvious that various modifications, rearrangements of parts and adjustments other than those shown and described will be possible and all such modifications, rearrangements of parts and adjustments are contemplated as will fall within the scope of the appended claims defining my invention.

What is claimed is:

1. The combination with a clutch operating mechanism including a clutch pedal operatively connected to a clutch throw-out collar, and an engine control mechanism including an accelerator pedal operatively connected to an engine throttle; of an air reservoir, a block out cylinder having a piston therein, an air control valve connected to said reservoir and blockout cylinder, linkage forming part of the operative connection between the clutch pedal and clutch throw-out collar, said linkage being connected to said air control valve and incapable of transmitting sufficient force to the clutch throw-out collar to release the clutch until after the air valve has been operated to admit air to said block out cylinder, and means operated by the piston of said block out cylinder and operating on said engine control mechanism intermediate the accelerator pedal and engine throttle to restrict the range of movement thereof.

2. The combination with a clutch operating mechanism including a clutch pedal operatively connected to a throw-out collar, and an engine control mechanism including an accelerator pedal operatively connected to an engine throttle; of a source of fluid pressure, a pressure control valve connected to said source of fluid pressure, force transmitting linkage forming part of the operative connection between the clutch pedal and the throw-out collar and having said pressure control valve included therein as a force transmitting element, a blockout cylinder having a piston therein and being connected to said pressure control valve, said pressure control valve operating to connect said blockout cylinder and source of pressure prior to movement of the throw-out collar towards clutch releasing position, means connecting the piston of said blockout cylinder to said engine control mechanism intermediate the accelerator pedal and engine throttle, and a lost motion connection forming part of said engine control mechanism and interposed between said accelerator pedal and the point of connection of said means to said engine control mechanism.

3. The combination with a clutch operating mechanism including a clutch pedal operatively connected to a throw-out collar, and an engine control mechanism including an accelerator pedal operatively connected to an engine throttle; of a fluid pressure reservoir, a blockout cylinder having a piston therein, a pressure control valve connected to said fluid pressure reservoir and blockout cylinder, force transmitting linkage forming part of the operative connection between the clutch pedal and the throw-out collar and including said pressure control valve as a force transmitting element, said linkage operating said pressure control valve to admit fluid under pressure to said blockout cylinder upon application of a force to the clutch pedal of a value less than that necessary to start clutch releasing movement, and means connecting the piston of said blockout cylinder to said engine control mechanism intermediate the accelerator pedal and engine throttle.

4. The combination with a clutch operating mechanism including a clutch throw-out collar, and an engine control mechanism including a throttle; of force transmitting linkage connected to the clutch throw-out collar, a controller device, and means connected to said controller device and operable thereby to block certain movements of the engine throttle, said controller device being connected in said force transmitting linkage and rendering the same incapable of transmitting sufficient force to release the clutch until after said means has been operated to block certain movements of the engine throttle.

5. The combination with a clutch operating mechanism including a clutch throw-out collar, and an engine control mechanism including a throttle; a force transmitting linkage connected to the clutch throw-out collar, a controller device, and means connected to said controller device and operable thereby to permit opening movement of the engine throttle, said controller device being a part of said force transmitting linkage and capable of operating said means to permit opening movement of the engine throttle only after the lapse of a predetermined time interval following substantially full clutch engagement.

JAMES F. CHAPMAN.